United States Patent
Wagner et al.

[15] 3,699,857
[45] Oct. 24, 1972

[54] COMBINED BATTERY TEST AND LIGHT METER FOR A PHOTOGRAPHIC CAMERA

[72] Inventors: Karl Wagner, Ottobrunn; Bernhard von Fischern, Munich, both of Germany

[73] Assignee: Agfa-Gevaert Aktiengesellschaft, Leverkusen, Germany

[22] Filed: July 8, 1970

[21] Appl. No.: 53,249

[30] Foreign Application Priority Data

July 12, 1969   Germany..........P 19 35 466.6

[52] U.S. Cl.............................95/10 CE, 95/10 CT
[51] Int. Cl.............................................G03b 7/08
[58] Field of Search......................95/10 CE, 10 CT

[56] References Cited

UNITED STATES PATENTS

| 3,220,326 | 11/1965 | Scudder | 95/10 C |
| 3,460,450 | 8/1969 | Ogihara | 95/10 C |
| 3,436,158 | 4/1969 | Schmitt | 95/10 C X |
| 3,502,010 | 3/1970 | Kennel | 95/10 C |
| 3,418,479 | 12/1968 | Schmitt | 95/10 C |
| 3,232,193 | 2/1966 | Stimson | 95/10 C |

*Primary Examiner*—Samuel S. Matthews
*Assistant Examiner*—Michael L. Gellner
*Attorney*—Michael S. Striker

[57] ABSTRACT

Indicator lamps for indicating sufficient and insufficient light for exposure are used for battery testing by connecting them in the emitter circuit of a switching transistor whose base voltage is controlled by a voltage divider in parallel with the battery. The voltage divider is adjusted to allow the lamp to light if the battery voltage exceeds the proper operating voltage or if the battery voltage is between a minimum acceptable voltage and the operating voltage. Otherwise the indicator lamps do not light regardless of the light available for exposure.

17 Claims, 3 Drawing Figures

COMBINED BATTERY TEST AND LIGHT METER FOR A PHOTOGRAPHIC CAMERA

BACKGROUND OF THE INVENTION

This invention relates to photographic cameras which have a battery for supplying energy for circuits such as for example an automatic exposure control arrangement. It further relates to such photographic cameras having an indicator arrangement which indicates whether or not sufficient light is available for exposure.

It is desirable that the user of such a camera be able to test the battery quickly and efficiently. It is further desirable that a circuit for permitting such a battery test make use of as many components as possible which are already contained in the camera, by decreasing the cost.

SUMMARY OF THE INVENTION

It is an object of this invention to provide a battery test arrangement which is simple to operate and economical to construct. The battery test arrangement is to indicate to the user when the output voltage of the battery has decreased to a predetermined value.

This invention comprises a camera having indicator means for indicating whether sufficient light is present for exposure. It further comprises a battery. Finally, a threshold circuit means interconnects the battery and said indicator means in such a manner that said indicator means is de-energized when the output voltage of the battery is less than a predetermined output voltage. Battery voltage is less than a predetermined battery output voltage.

The threshold voltage to which the threshold circuit is responsive depends upon the battery output voltage and, furthermore, may be made adjustable.

Thus in accordance with this invention the battery testing arrangement makes use of the arrangement already present in the camera which is used to indicate the absence or presence of sufficient light for an exposure. If the battery output voltage is sufficiently high, the indicator arrangement indicates whether sufficient light is or is not available. If, however, the battery voltage has decreased to a value under which reliable operation cannot be obtained, the user of the camera is advised that it is necessary for the battery to be replaced.

Preferably, the threshold circuit comprises a transistor having an emitter. The indicator lamps are connected into the emitter circuit, while the base of the transistor is connected with the voltage divider tap of the voltage divider which is connected in parallel with the battery. The voltage divider ratio is so adjusted that the threshold voltage of the transistor corresponds to the lowest acceptable operating voltage of the battery.

In a further embodiment of the present invention a switch contact may be provided which connects the base of the transistor alternatively to a first or a third resistance each of which forms part of the voltage divider when connected to the base. One of the resistances may be so adjusted that the threshold voltage of the transistor corresponds to a desirable operating output voltage of the battery, while the other resistance may cause the voltage divider ratio to be such that the transistor threshold voltage corresponds to the minimum acceptable battery output voltage. Thus the user of the camera receives warning that the battery output voltage is beginning to decrease before the time that this output voltage actually becomes unusable. When the battery output voltage has decreased below the desired battery output voltage but is still above the minimum acceptable battery output voltage, the indicator means will light to indicate the light available for exposure when the first resistance forms part of the voltage divider, but will fail to operate when the third resistance forms part of the voltage divider.

In a preferred embodiment of the present invention the indicator arrangement may comprise a first and second lamp, respectively for indicating insufficient and sufficient light for exposure. The two lamps may have different colors associated therewith, for example insufficient light may be indicated by a red lamp, while sufficient light may be indicated by a green lamp.

If the camera has an automatic exposure control circuit which has an output transistor with an electromagnet for controlling the shutter as load, then, in one embodiment of the present invention, switching means can be provided to disconnect the shutter magnet and connect in its stead one of the indicator lamps in series with the switching transistor. It is further possible to connect inverter means such as another transistor to invert the output of the output transistor contained in the exposure control circuit. The switching means can then have a normally open can of contacts operated simultaneously with the contacts associated with the shutter magnet, for connecting the second lamp as a load to the inverter transistor.

In another preferred embodiment of the present invention the light sensitive element which is responsive to the light available for an exposure controls the movement of a moving coil instrument. The moving coil instrument has a conducting arm which rotates therewith. A first conducting segment is connected to the first indicator lamp and a second conducting segment to the second indicator lamp. The indicator lamps are, of course, still connected in the emitter circuit of the switching transistor. (It is not essential of course that the emitter circuit be the circuit in which the lamps are connected. They could equally well be connected in the collector circuit. The main idea of this invention is merely that the conduction of the switching transistor is controlled by the base voltage which in turn depends upon the output voltage of the battery). To resume, the current through the moving coil instrument causes the conducting arm to make contact either from the first conducting segment to one side of the battery or from the second conducting segment. Thus, depending upon the light conditions, either the first or the second indicator lamp will light, indicating either insufficient or sufficient light. Of course in the absence of sufficient voltage at the base of the switching transistor neither of the lamps will light, indicating that a battery replacement is essential. Since the moving coil instrument utilized herein may be present in the instrument anyway for controlling the aperture, it is obvious that very few additional components are required for effecting the battery test. If, in this embodiment, it is desired to give the user a chance to test not only for a desired battery output voltage but also for a minimum output voltage, then a voltage divider having a first and second resistance may be connected in parallel with the battery.

The base of the switching transistor is connected to the common point, or voltage divider tap. A third resistance is provided. A battery test switch then selects either the first or the third resistance to form part of the voltage divider. By activating this battery test switch, the user may then test for the desired battery output voltage and, if the battery output voltage is lower than the desired output voltage, he may proceed to test for a minimum battery output voltage with which operation of the camera can still take place.

The selection of one of the two resistances for the voltage divider means can also be accomplished by use of the moving conducting arm carried by the moving coil instrument. For example, the movement of the moving coil instrument may cause the first resistance to be connected to the voltage divider means when the illumination is sufficient for an exposure and may cause the third resistance to be connected to the voltage divider means when the light is insufficient for an exposure. In this way the conducting arm associated with the moving coil instrument may be used in itself as a contact element.

In another preferred embodiment of the present invention a single indicator lamp may be connected in the emitter circuit of the switching transistor. The moving coil instrument may have a translucent window affixed to the pointer (moving arm). The pointer may be of electrically conductive material. This pointer is then connected with the second resistance of the voltage divider means. Depending upon the amount of deflection of the pointer, one or the other of the contact segments associated in this case with the first and third resistances of the voltage divider means will be connected to the second resistance of said voltage divider means. In this case under sufficient illumination the resistance for the desired operating output voltage would be connected to the voltage divider for determining the base voltage. If the lamp indicative of sufficient light did not light, the user of the camera could shade the light sensitive element and thus determine readily whether the battery still had a sufficient output voltage for carrying on a few more exposures; that is, if the lamp indicating insufficient light would light after the light sensitive element has been shaded, then the battery is still in adequate condition. If, however, the lamp did not light battery replacement would be indicated.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
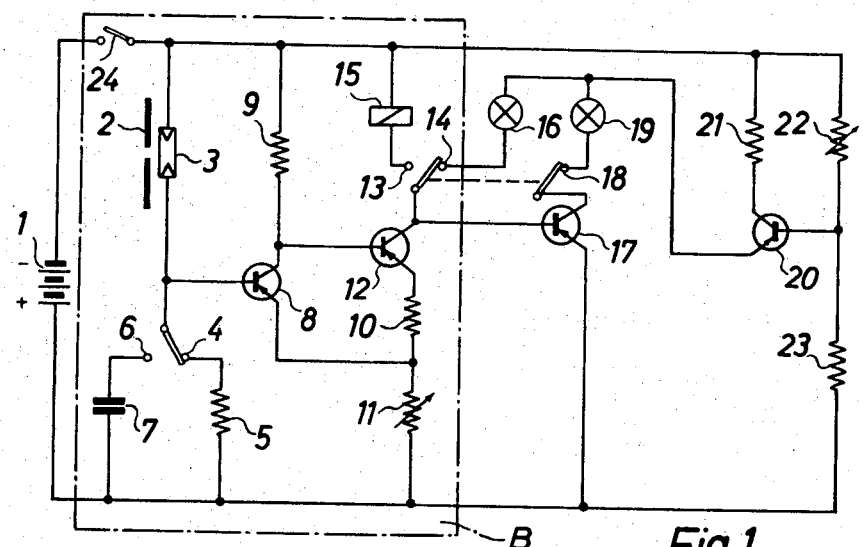
FIG. 1 shows a first embodiment of the battery test arrangement in accordance with this invention and its interconnection with the remaining camera circuitry.

The preferred embodiment of the present invention will now be described with reference to the drawing.

FIG. 1 shows a battery denoted by reference numeral 1 which, in this particular embodiment, furnishes the energy for an automatic exposure control arrangement included in dot-dash lines and denoted by reference letter B. The automatic exposure control circuit B comprises a photoresistance 3 which may be shaded by a shutter 2 and which is connected in series with either a resistance 5 or a capacitor 7 depending upon the position of a switch contact which can be activated by the camera relief button. The series circuit is connected in parallel with the battery 1, a single pole switch 24 also operable by the camera relief button being interposed between the battery 1 and the photoresistor 3. At the common point between photoresistance 3 and the resistor 5 is connected the base of a transistor 8, a resistance 9 being in the collector circuit of said transistor 8. The emitter of transistor 8 is connected with a voltage divider comprising resistances 10 and 11. This voltage divider is connected to the emitter of output transistor 12 whose base is connected to the collector of transistor 8. The collector of transistor 12 may be connected to the shutter control relay magnet 15 or, alternatively, an indicator lamp 16 depending upon the position of the moving arm of first switch means having contact 13 associated with the shutter control magnet and 14 associated with the indicator lamp. Indicator lamp 16 is used to indicate insufficient light for exposure. The collector of the output transistor 12 is further connected with the base of inverter transistor 17 whose collector is connected to indicator lamp 19 which light if sufficient light for an exposure is present. Indicator lamps 16 and 19 are respectively referred to as first and second indicator lamps herein. Indicator lamp 19 is connected to the collector of inverter transistor 17 by means of a normally open pair of contacts 18. The emitter of inverter transistor 17 is connected to the positive side of battery 1. The side of indicator lamp 19 not connected to the normally open switch contacts 18 is connected, in common with the corresponding side of indicator lamp 16 to the emitter of switching transistor 20. The collector of switching transistor 20 is connected to the negative side of the battery via a resistance 21, while the base of transistor 20 is connected to the negative side of the battery via a variable resistance 22. The base of resistor 20 is further connected to the positive side of the battery via a resistance 23. Resistances 22 and 23 constitute first voltage divider means. The moving arm for closing normally open contacts 18 is mechanically coupled to the moving arm associated with the above-mentioned switch contacts 13 and 14. The contacts mentioned above, in conjunction with both moving arms are referred to herein as first switch means.

The above-described arrangement operates as follows:

First it will be assumed that sufficient light is present for an exposure and that the battery output voltage has not dropped below a predetermined battery output voltage. For test purposes, the contacts assume the position shown in FIG. 1. Closing of contact 24 causes the automatic control means B as well as the indicator means and the battery test arrangement to be connected with battery 1. Base of transistor 8 is negative relative to its emitter, causing this transistor to be conductive. Therefore the base of transistor 12 is positive relative to its emitter causing transistor 12 to be blocked. Therefore lamp 16 which indicates insufficient light for an exposure does not light up. However, the base of transistor 17 is negative relative to its emitter so that transistor 17 is conductive. Since the variable resistor 22 has been adjusted for the minimum acceptable battery output voltage, and it is assumed that the battery output voltage exceeds this minimum acceptable value, transistor 20 is highly conductive causing current to flow through resistance 21, the collector-emitter circuit of transistor 20, indicator lamp 19, contact 18 and the collector-emitter circuit of inverter transistor 17.

The user of the camera therefore notes first, that sufficient light is present for an exposure and, secondly, that the battery voltage is still high enough for energizing all circuits required in the successful taking of a picture.

Contacts 4 and 6 and 13 and 14 as well as contact 18 are activated by the camera release button which is not illustrated. They are initially in the position shown in FIG. 1 and are moved into proper operating position in accordance with a predetermined operating cycle after activation of the release button.

If however the battery output voltage is still sufficiently high but insufficient light is present for an exposure, then transistor 12 is fully conductive, transistor 17 is blocked, lamp 16 lights up, while lamp 19 remains dark.

If however the operating voltage has decreased to below a predetermined value thus causing it to be insufficient for the proper taking of pictures, then the base of transistor 20 is positive relative to its emitter causing this transistor to be blocked. Therefore neither of the lamps can light, regardless of the light conditions present. The fact that neither of the lamps light indicates to the user that the battery must be replaced. Indicator lamps 16 and 19 are preferably arranged in the vicinity of the viewfinder and may be characterized by different colors, for example red and green.

During the time that the exposure time is being determined, contacts 6 and 13 are connected while contact 18 remains open. The automatic exposure control then takes place in known fashion.

Figure 2:
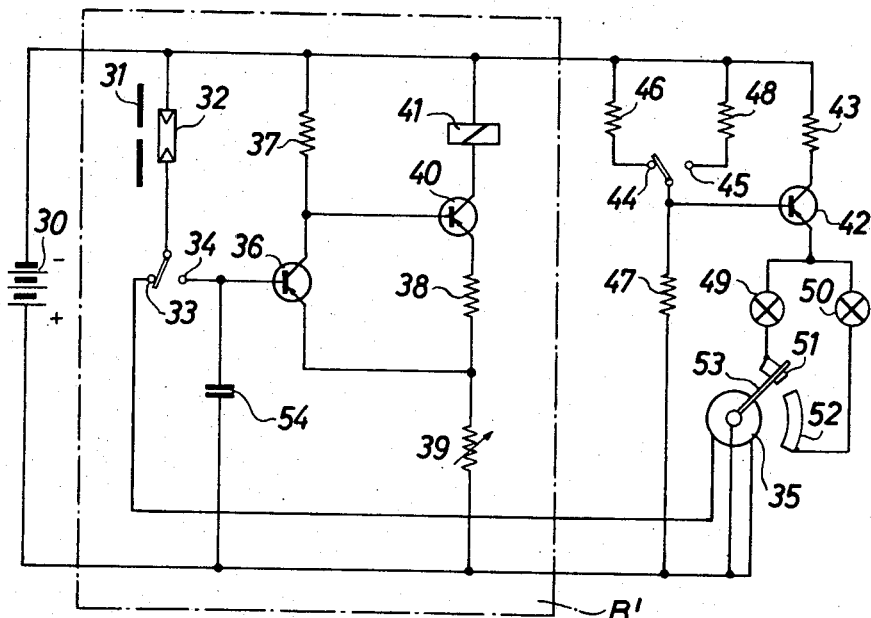
FIG. 2 shows a second embodiment of the battery test arrangement in accordance with this invention and its interconnection with the remaining camera circuitry.

FIG. 2 shows a second embodiment of the present invention using an electronic exposure control circuit and a battery test arrangement in accordance with the present invention. The circuit further utilizes an indicator arrangement comprising a moving coil instrument.

The automatic exposure control circuit is denoted by B'. It comprises a photoresistance 32 connected in series with either a capacitor 54 or a moving coil instrument 35 by means of a double throw switch having contact 33 associated with the moving coil instrument and a coil 34 associated with capacitor 54. The series combination is connected in parallel with the battery 30. Connected to contact 34 is the base of a transistor 36 whose collector is connected to the negative side of the battery by means of a resistance 37. The emitter of transistor 36 is connected to the positive side of the battery by means of the variable resistance 39. Also connected to the collector of transistor 36 is the base of output transistor 40 whose collector is connected to the negative side of the battery via shutter control magnet 41 and whose emitter is connected via a resistance 38 with the emitter of transistor 36. In the embodiment illustrated in FIG. 2, the switching transistor is denoted by reference numeral 42. This switching transistor has a collector connected to the negative side of the battery by means of a resistance 43 and an emitter connected to one side of each of two indicator lamps, namely lamps 49 and 50, respectively designed to indicate insufficient light for an exposure and sufficient light for an exposure. The other terminal of lamps 49 and 50 are respectively connected to contact segments 51 and 52. A contact arm 53 associated with the moving coil instrument 35 and mechanically coupled to deflect in accordance with the deflection of said moving coil instrument connects either contact segment 51 or contact segment 52 with the positive side of the battery, depending upon the current flowing through the moving coil instrument, that is, depending upon the light impinging upon photoresistance 32. Again, indicator lamps 49 and 50 may be characterized by different colors such as, for example, red and green. The base of transistor 42 is connected via a resistance 47 to the positive side of the battery and via either a resistance 46 or a resistance 48 with the negative side of the battery. Either one of resistors 46 and 48 in conjunction with resistance 47 constitutes voltage divider means. Specifically, resistor 47 is herein referred to as the second resistance, while resistors 48 and 46 are respectively referred to as the first and third resistance constituting said voltage divider means. Selection between resistances 46 and 48 is made by means of a double throw switch having a contact 44 associated with resistor 46 and a contact 45 associated with resistance 48. The ratio of resistances 46 and 47 is determined in such a manner that the transistor becomes conductive as long as the battery output voltage exceeds the predetermined minimum value, while the ratio between resistance 48 and 47 is so determined that transistor 42 remains conductive only if the battery output voltage exceeds a desired operating voltage. The double throw switch which contacts 44 and 45 constitutes battery test switch means. It may be operable either manually or by a mechanical coupling with conducting elements 53.

If sufficient light for an exposure is present and the battery output voltage is at least equal to the desired battery output voltage, then moving element 53 is connected with contact segment 52. The base of transistor 42 has a voltage determined by the ratio of resistors 48 and 47. Transistor 42 is conductive causing lamp 50 to light thus indicating to the user that an exposure may be effected. If light conditions are insufficient, moving element 53 is connected with contact segment 51 so that lamp 49 is lit. For this condition of pointer 53 contact 44 is closed if the test switch means is mechanically coupled to the pointer. Therefore, the voltage divider comprises resistors 46 and 47 whose ratio is adjusted in such a manner that transistor 42 will remain conductive as long as the output voltage of battery 30 exceeds a predetermined minimum voltage. Under these conditions lamp 49 will light if the battery output voltage is sufficiently high to allow the taking of a picture. If, however, the voltage divider remains with resistors 48 and 47, then the lamp 49 would not light even under insufficient lighting conditions if the battery operating voltage were below the desired battery output voltage.

If it is now assumed that the battery output voltage is between the minimum and the desired battery output voltage and the voltage divider is set to comprise resistances 48 and 47, then neither of the indicator lamps will light regardless of external light conditions. The battery test switch must then be connected to include resistance 46 in series with resistance 47. If neither of the lamps lights with this setting, the battery must be replaced.

Figure 3:
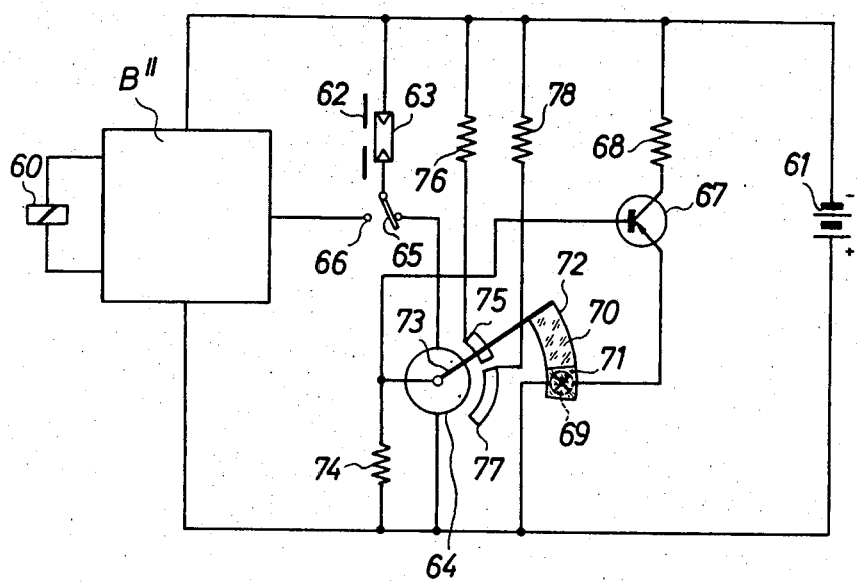
FIG. 3 shows a third embodiment of the present invention.

FIG. 3 shows a third embodiment of the present invention. Here the electronic exposure control circuit is labeled B'' and has connected therewith the shutter control magnets 60. The battery is labeled 61. Connected to the negative side of the battery is one side of a photoresistance 63 which again may be shaded by a shutter 62. The other terminal of photoresistor 63 may be connected with either a terminal 66 or a terminal 65 by means of a double throw switch. Terminal 66 is associated with the exposure control circuit, while terminal 65 is connected to one side of a moving coil instrument 73 whose other side is connected to the positive battery terminal. The automatic exposure control system B'' may be identical to the circuit B shown in FIG. 1. The switching transistor in this embodiment is a transistor 67 which has a collector connected to the negative side of the battery by means of a resistance 68 and an emitter connected to the positive side of the battery through an indicator lamp 69. The base of transistor 67 is connected to the positive side of the battery via a resistance 74 which forms part of the voltage divider means. The moving coil instrument 64 has an electrically conductive contact arm 73 which moves in accordance with the deflection of the coil. Contact arm 73 connects to either a contact segment 75 or a contact segment 77 depending upon the current flowing through photoresistance 63. Contact segment 75 is connected to the negative side of the battery via a resistance 76, also part of the voltage divider means while contact segment 77 is connected to the negative side of the battery via a resistance 78 which forms part of the voltage divider means when the moving arm 73 is in contact with contact segment 77. One extremity of contact arm 73 has connected therewith a translucent window or foil which may have a first and second color, for example, red as indicated by reference numeral 71 and green as indicated by reference numeral 72. Movement of the pointer 73 causes one or the other of regions 71 or 72 to cover the indicator lamp thus indicating insufficient or sufficient light conditions respectively. When pointer 73 is in the position shown in FIG. 3, the voltage divider comprises resistances 76 and 74 whose ratio is so adjusted that the voltage at the base of transistor 67 will cause this transistor to be conductive as long as the battery output voltage is less than the minimum value required for effecting a few more exposures. This position of the pointer corresponds to insufficient light. If sufficient light for an exposure is present, pointer 73 connects resistance 78 to resistance 74 via contact segment 77. The voltage divider ratio now adjusts the voltage at base of transistor 67 in such a manner that this transistor is only conductive if the battery output voltage is at least equal to a desired battery output voltage. If lamp 69 does not light when the green area 72 is covered, then the user may shade photoresistance 63 causing pointer 73 to make contact with contact segment 75. Indicator lamp 69 will now light if the battery output voltage exceeds the minimum required battery output voltage. Failure of lamp 69 to light under these conditions indicates that a change of battery is required.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. In a camera, a combined battery and available light test arrangement, comprising, in combination, indicator means, furnishing, only when energized, a first output in the presence of sufficient light for an exposure and a second output in the absence of sufficient light for an exposure; battery means having a battery output voltage; and threshold circuit means responsive only to a threshold voltage corresponding to said battery output voltage independent of available light, or connecting said battery means to said indicator means thereby energizing the latter only when said battery output voltage exceeds a predetermined battery output voltage, whereby the presence of said first or said second output of said indicator means indicates the battery output voltage exceeding said predetermined battery output voltage.

2. A camera as set forth in claim 1, wherein said indicator means comprise at least one indicator lamp.

3. A camera as set forth in claim 2, wherein said indicator means comprise a first and second indicator lamp, respectively indicative of sufficient and insufficient light for an exposure when lit.

4. A camera as set forth in claim 3, wherein each of said lamps has a different color.

5. A camera as set forth in claim 3, further comprising a light sensitive element connected to said battery, the current through said light sensitive element varying in dependence upon the light impinging thereon; moving coil means connected to said light sensitive element; and means for energizing said first or said second indicator lamp in dependence upon the position of said moving coil means.

6. A camera as set forth in claim 5, wherein said means for energizing said first or said second indicator lamp comprise a conducting arm connected to said moving coil means; a first contact segment connected to said first indicator lamp; a second contact segment connected to said second indicator lamp, said conducting arm contacting said first or said second contact segment in dependence upon the current through said moving coil means.

7. A camera as set forth in claim 6, wherein said moving arm contacts said first contact segment when insufficient light is present for exposure and said second contact segment when sufficient light is present for exposure.

8. A camera as set forth in claim 2, further comprising moving coil means having a conducting arm deflecting in dependence upon the light available for exposure; transluscent window means having a first and second color, connected to said conducting arm for movement therewith, and positioned relative to said indicator lamp to cover said indicator lamp with said first or second color depending upon the movement of said conducting arm, whereby an illuminated first transluscent window color constitutes said first output and illuminated second transluscent window color constitutes said second output.

9. A camera as set forth in claim 1, wherein said threshold circuit means comprise a switching transistor having an emitter, a base, and a collector; first voltage divider means connected in parallel with said battery and having a voltage divider tap connected with the base of said switching transistor; and means connecting said indicator lamp to the emitter of said switching transistor.

10. A camera as set forth in claim 9, wherein said first voltage divider means comprise a variable resistance, thereby permitting adjustment of said predetermined threshold voltage.

11. A camera as set forth in claim 10, further comprising an automatic exposure control circuit having an output transistor and a shutter control relay; and indicator switching means selectively connecting either said shutter control relay or said first indicator lamp with said output transistor.

12. A camera as set forth in claim 11, further comprising an inverter transistor connected with said output transistor; and wherein said indicator switching means further comprise additional switching means selectively connecting or disconnecting said second indicator lamp from said inverter transistor.

13. A camera as set forth in claim 12, wherein said output transistor has a collector; wherein said inverter transistor has a base, said base of said inverter transistor being connected to said collector of said output transistor.

14. A camera as set forth in claim 9, wherein said first voltage divider means comprise a first, second and third resistance; and a battery test switch for selectively connecting said first or said third resistance in series with said second resistance, thereby permitting adjustment of said threshold voltage to an operating threshold voltage and a minimum threshold voltage, corresponding, respectively, to a desired operating battery output voltage and a minimum battery output voltage permitting only a limited number of subsequent camera operations.

15. A camera as set forth in claim 14 further comprising a battery test button for operating said battery test switch.

16. A camera as set forth in claim 14, further comprising moving coil means having a conducting arm deflected in dependence upon the light available for exposure; translucent window means connected to said conducting arm for movement therewith and positioned relative to said indicator lamp to cover said indicator lamp with one of said colors depending upon the movement of said conducting arm; and wherein said battery test switch comprises a first contact segment connected to said first resistance, a second contact segment connected to said third resistance, and means connecting said conducting arm with said second resistance.

17. A camera as set forth in claim 9, wherein said first voltage divider means comprise variable resistance means.

* * * * *